United States Patent Office 3,320,048
Patented May 16, 1967

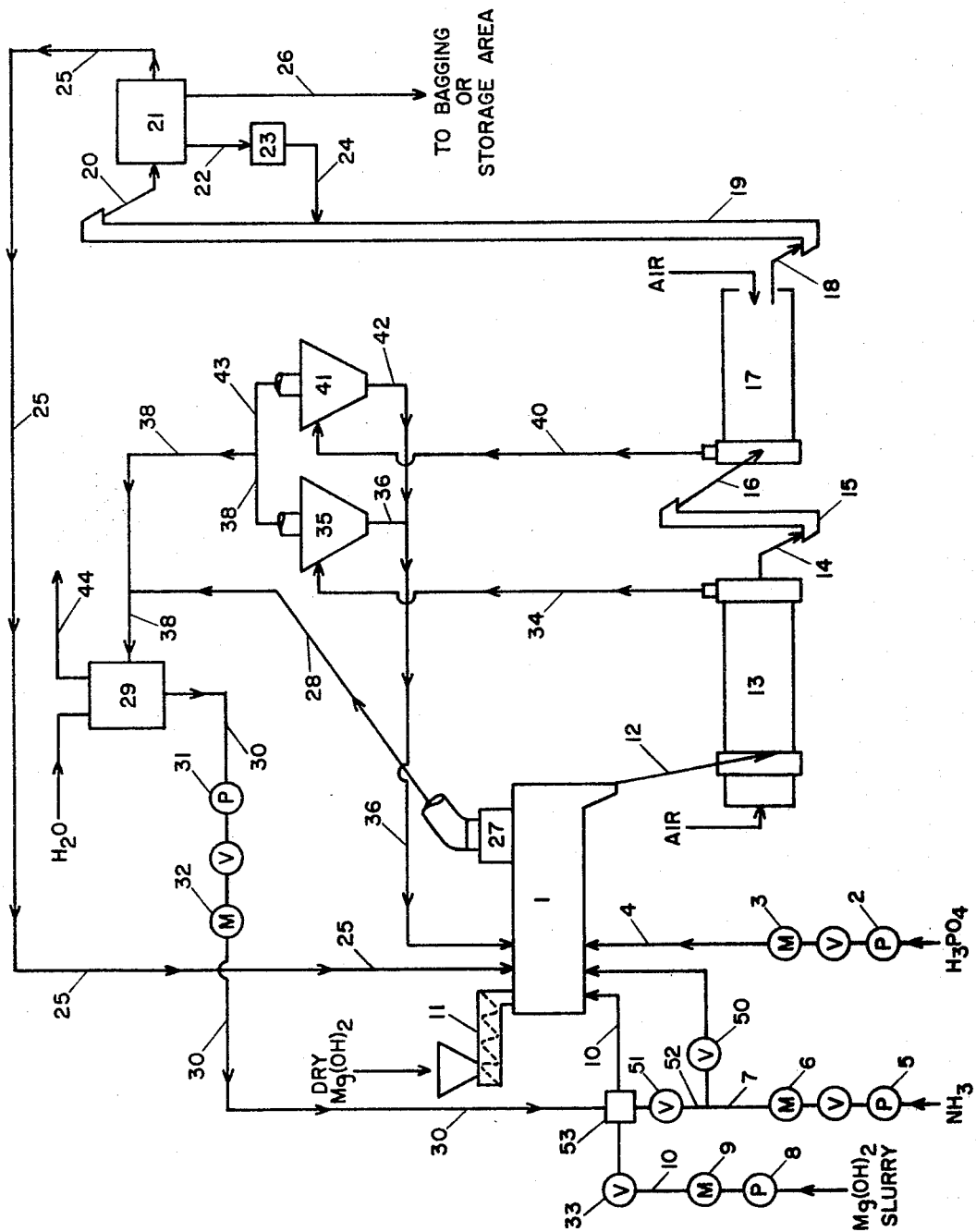

3,320,048
PROCESS FOR THE PREPARATION OF MAGNESIUM AMMONIUM PHOSPHATE
Casimer C. Legal, Baltimore, and Burton L. Mobley, Ellicott City, Md., assignors to W. R. Grace & Co., New York, N.Y., a corporation of Connecticut
Filed May 26, 1964, Ser. No. 370,291
9 Claims. (Cl. 71—42)

This invention relates to fertilizer. More particularly, it relates to a process for preparing fertilizer grade magnesium ammonium phosphate.

In summary, this invention involves a fully continuous process for preparing granular fertilizer grade magnesium ammonium phosphate comprising; (a) reacting ammonia, magnesium hydroxide, and phosphoric acid solution analyzing about 40–58% $P_2O_5$ in the mole ratio of $NH_3:Mg(OH)_2:H_3PO_4$ of about 1–1.1:1:1 in a reactor-granulator; (b) drying the resulting granules in a drying unit; (c) screening the thus dried granules in a screening device and recovering, (1) those granules passing a 3 mesh screen and retained on a 6 mesh screen, and (2) those granules passing a 6 mesh screen and retained on a 16 mesh screen; (d) recycling the fine, −16 mesh, granules to the reactor-granulator; (e) crushing the oversize, +3 mesh, granules and recycling the crushed particles to said screening device; (f) simultaneuosly passing air from the drying and cooling units through dust collectors and recycling the collected dust to the reactor-granulator; (g) simultaneously passing exhaust air from the reactor-granulator and the dust collectors through a water tower, whereby ammonia vapor in said air is absorbed in water; and (h) simultaneously recycling the thus absorbed ammonia to the reactor-granulator.

Magnesium ammonium phosphate fertilizer is of special value as a non-burning fertilizer. It is also especially valuable when planting trees (both fruit trees and forest trees), because several years supply of fertilizer can be placed under a small tree at planting time. Magnesium ammonium phosphate is also of substantial value in fertilizing lawns, turfs, flower gardens, and vegetable gardens, because there is essentially no danger of burning the fertilized plants with over applications of said fertilizer. One can supply perennial plants, e.g., shrubs, with several season's fertilizer supply at the time the trees are planted. With annual plants, one application of magnesium ammonium phosphate fertilizer will do for the entire growing season.

The term percent (%), as used in this disclosure, means percent by weight, unless otherwise defned, and the term mesh, as used herein, when referring to screen or particle size, means U.S. standard mesh.

It is an object of this invention to prepare a fertilizer grade magnesium ammonium phosphate. It is another object of this invention to prepare a fertilizer (magnesium ammonium phosphate) containing about 7–9% nitrogen (as N) and about 42–45% $P_2O_5$ depending upon the type and purity of the phosphoric acid and magnesium hydroxide used in the preparation of said magnesium ammonium phosphate. A higher analysis fertilizer is obtained with furnace grade phosphoric acid than with wet process acid, and wet process phosphoric acid containing large amounts of such impurities as iron, aluminum, and calcium compounds and silica gives a lower analysis fertilizer than purer lots of wet process acid. A purer, higher analysis, product is obtained when magnesium hydroxide of high purity, e.g., at least about 95–98% $Mg(OH)_2$, is used than when magnesium hydroxide of lower assay is used. In addition, the N and $P_2O_5$ analyses are higher in the case of a well dried product than in the case of an incompletely dried material. It is still another object of this invention to prepare said fertilizer by a continuous process from ammonia, magnesium hydroxide, and phosphoric acid.

The phosphoric acid used in the process of this invention can analyze about 40–58% $P_2O_5$; however, that analyzing about 50–55% $P_2O_5$ is preferred. Either wet process or furnace grade phosphoric acid can be used, but furnace grade acid is preferred. While dry magnesium hydroxide can be used, an aqueous slurry of magnesium hydroxide in water is preferred. When dry magnesium hydroxide is fed, it is necessary to supply additional water (e.g., ca. 1.1-1.3 pounds of water per pound of dry magnesium hydroxide) to the reactor to obtain good conversion and satisfactory granulation of the product. The magnesium hydroxide can be reagent grade, but for economic reasons, commercial grade magnesium hydroxide analyzing about 95–98% $Mg(OH)_2$ is preferred. Slurries analyzing lower than 40% solids and about 30–40% $Mg(OH)_2$ can be used, but slurries analyzing about 46% $Mg(OH)_2$ are preferred. Either aqua ammonia ($NH_3$ dissolved in water) or liquid anhydrous ammonia can be used in the process of this invention, but liquid anhydrous ammonia is preferred.

In the process of this invention the reactants combine in a stoichiometric ratio of 1 mole $Mg(OH)_2$, 1 mole $NH_3$ and 1 mole $H_3PO_4$, thereby reacting to form magnesium ammonium phosphate. However, due to the inevitable loss of $NH_3$ from the system, we prefer to add about 1.05 mole of $NH_3$ per 1 mole each of $H_3PO_4$ and $Mg(OH)_2$.

In the process of this invention the reactants are preferably fed continuously into a reactor-granulator which is partially filled with solid magnesium ammonium phosphate, while continuously removing magnesium ammonium phosphate product from said reactor. (If the reactor is not a granulator, a granulator is placed immediately downstream of the reactor; a pug mill, mixer-granulator, or the like can be used as a granulator.)

When starting a run, the reactor is partially filled with magnesium ammonium phosphate from a previous run. When starting the first run in a new plant, magnesium ammonium phosphate, for placing in the reactor, can be made batchwise. For example, magnesium hydroxide, ammonia, and phosphoric acid can be simultaneously fed into an agitated tank, in a mole ratio of about 1:1:1, thereby precipitating magnesium ammonium phosphate which is recovered, dried, screened (e.g., to about minus 16 mesh), crushed, if necessary, and charged into the reactor.

When operating the process of this invention, solid granular magnesium ammonium phosphate product is removed continuously, dried, screened, and recovered. Although not essential to the process, we prefer to cool the dried magnesium ammonium phosphate before screening. Two fractions suitable for fertilizer application are obtained. One of said fractions passes a 3 mesh screen and is retained on a 6 mesh screen; the other passes a 6 mesh screen and is retained on a 16 mesh screen. Fines (i.e., particles minus 16 mesh) are recycled to the reactor, and oversized particles (i.e., those particles retained on a 3 mesh screen) are crushed and returned to the screens.

The process of this invention can be illustrated best by reference to the accompanying drawing. Said drawing is a flow diagram of a preferred embodiment of said process.

The raw materials ($H_3PO_4$, $NH_3$, and $Mg(OH)_2$) are blended together in reactor-granulator 1 where said materials are reacted to form $MgNH_4PO_4 \cdot H_2O$ granules. Phosphoric acid is fed into said reactor, from an acid storage tank (not shown), via pump 2, flow meter 3, and line 4. Ammonia, from a storage tank (not shown), enters the reactor via pump 5, flow meter 6, and line 7. Magnesium hydroxide slurry is fed into the reactor, from a storage tank (not shown), via pump 8, flow meter 9, and line 10. Alternatively, dry magnesium hydroxide can be used as a source of magnesium. When dry magnesium hydroxide is used, said magnesium hydroxide is fed from a storage bin (not shown) to dry feeder 11 which can be a screw conveyor, belt conveyor, or the like, and water is fed into the system via pump 8, flow meter 9, and line 10. Granules of magnesium ammonium phosphate pass from reactor-granulator 1 to dryer 13 via chute 12; dried granules exit dryer 13 via chute 14 and enter elevator 15 from which said granules pass via chute 16 to cooler 17. (If desired, the capacity of the plant can be increased by replacing cooler 17 with a second dryer.) The cooled granules pass via chute 18, elevator 19 and chute 20 to screening device 21. The granules are screened into 4 size ranges. These are; (1) oversize particles (plus 3 mesh; (2) fines (minus 16 mesh); and (3) two lots of product size particles. The two lots of product size particles are; (a) those particles which pass a 3 mesh screen and are retained on a 6 mesh screen; and (b) those particles which pass a 6 mesh screen and are retained on a 16 mesh screen. The oversize particles pass from screening device 21, via chute 22 to crushing device, or crusher, 23 from which the crushed particles are recycled to elevator 19 via chute 24. Both lots of product size particles pass from screening device 21 to a bagging and storage area (not shown), where the product is recovered, via two chutes 26 (only one of which is shown). Fine particles pass from screen, or screening device, 21 to chute 25 which recycles said fine particles to reactor-granulator 1. Provision is made in the plant (but not shown in the drawing) to recycle part or all of the product size particles to the reactor-granulator via chute 25. As shown in the drawing, air flow through the dryer is concurrent with the flow of the granules; however, if desired, the process can be modified to use counter current air flow. Air, dust and a small amount of escaping ammonia vapor leave dryer 13 via line 34 and pass to dust separator 35 where most dust particles drop to the bottom of said separator and pass from said separator to reactor-granulator 1 via chute 36. Air and ammonia vapor pass from dust separator 35 via line 38 to water scruber 29. Air flow through cooler 17 is shown in the drawing as counter current to the flow of the solid particles passing through the said cooler; however, if desired, concurrent air flow can be used. Air from the cooler plus some dust particles and a small amount of escaping ammonia papor pass, via line 40, to dust separator 41 where most particles of dust drop to the bottom and pass from said separator via chute 42 to chute 36, and then to reactor-granulator 1. Air and ammonia vapor exit from dust separator 41 via line 43 and pass to line 38 and thence to water scruber 29. Simultaneously, air and ammonia vapor escaping from reactor-granulator 1 are circulated, via hood 27, to line 28 and then to water scruber 29, via line 38. Water scrubbed air leaves scruber 29 via line 44. Water from the scrubber contains ammonia dissolved from the scrubbed air and a very small amount of magnesium ammonium phosphate present as a suspension of solid particles. Said water-ammonia-magnesium ammonium phosphate mixture passes from said scruber via line 30, pump 31, and flow meter 32. Line 30 feeds into line 10 via mixing device 53 which can be an in line mixer or blender, a mixing cross, or two closely spaced mixing T's positioned in series. Other mixing devices will be readily apparent to those skilled in the art. Mixing device 53 is positioned in line 10 between valve 33 and reactor-granulator 1. If desired, the ammonia and magnesium hydroxide slurry can be premixed in mixing device 53 by closing valve 50 and opening valve 51, thereby feeding ammonia, from line 7, into said mixing device via line 52.

We prefer to use a pug mill as reactor-granulator; however, numerous other suitable devices, including rotary mixers, rotary granulators, and the like, will be readily apparent to those skilled in the art. The dryer shown in the drawing is a rotary dryer. Numerous other types of drying apparatus suitable for use in the process of this invention will be readily apparent to those skilled in the art; among such devices are tunnel dryers, mechanically agitated dryers, vacuum dryers, and the like. The dryer can be directly heated or indirectly heated. When using indirect heat steam coils or electric cables wrapped around the device or inserted therein can provide suitable source of heat. With direct heating the flame formed by burning a suitable liquid, gas, or solid fuel can be used. Other means of applying heat will be readily apparent to those skilled in the art. The cooler shown in the drawing is a rotary cooler; however, other types of coolers including conveyor belt coolers, mechanically agitated coolers, and the like, will be readily apparent to those skilled in the art. The dust separators shown in the drawing are cyclone separators. Numerous other types of separators which can be used in the process of this invention will be readily apparent to those skilled in the art. Among such separators are bag filters, electrical precipitators, and special air filters. As shown in the drawing, solid materials are transported from one apparatus unit to the next via chutes or elevators. It will be readily aparent to those skilled in the art that other devices such as conveyor belts, screw conveyors, and the like can be used in place of chutes and elevators. The screening device used to separate the dried and cooled magnesium ammonium phosphate granules into product, oversized particles, and fine particles can be vibrating screens, shaking screens, trommels, and the like. The crusher, or crushing device, can be a coffee mill type crusher, a stamp mill, hammer mill, roll crusher, or the like.

The process of this invention is illustrated by the following examples which are intended to be illustrative only and are not intended to limit the scope of the invention as disclosed in this specification.

*Example I*

At the start of the run about 10,000–15,000 lbs. of crushed $MgNH_3PO_4 \cdot H_2O$ granules from a previous run were charged into the reactor-granulator. Then the reactants ($H_3PO_4$ solution, ca. 75% $H_3PO_4$, liquid anhydrous $NH_3$, and an aqueous slurry of $Mg(OH)_2$, ca. 31% $MgO$) were added at the following rates; (1) phosphoric acid, 8,690 lbs. per hour; (2) liquid anhydrous ammonia, 1,185 lbs. per hour; and (3) magnesium hydroxide slurry 8,635 lbs. per hour. Within a few minutes the reaction product begins to pass from the reactor to the dryer. At this time the flow of water (ca. 6–12 gallons per minute) to the water scrubber was started. In about 5–10 minutes, dry magnesium ammonium phosphate began to pass from the dryer to the elevator leading to the cooler. After about 10–15 minutes cooled product began to leave the cooler. At this time the screening device and the elevator leading to said device were placed into operation, and, as oversize material was discharged from the screening device, said oversized material passed to the crushing device which was placed in operation. Product was recovered in two lots. The first lot passed a 3 mesh screen and was retained on a 6 mesh screen; the second lot passed a 6 mesh screen and was retained on a 16 mesh screen. The production rate (rate at which product was recovered) was about 5 tons per hour. A composite sample of said product collected over a period of about 12 hours had the following analysis; 8.78% nitrogen as N, 46.51% total $P_2O_5$, 45.74% available $P_2O_5$, and 21.47% $MgO$. This composition represents a mole ratio of magnesium oxide to $P_2O_5$ of 1.63:1.

*Example II*

This run is a continuation of the run described above; it was made without stopping the previous run. Apparatus and feed materials and feed rates were identical to those described in Example I. This run was of 20 hours duration, and, at the end of the 20 hour period, about 100 tons of magnesium ammonium phosphate had been prepared. The recovered magnesium ammonium phosphate product analyzed; 8.55% nitrogen as N, 46.05% total $P_2O_5$, 44.79% available $P_2O_5$, and 22.64% MgO. This represents a mole ratio of MgO to $P_2O_5$ of 1.73:1. The above results were obtained on the analysis of a composite sample taken over the entire 20 hour period of the run.

What is claimed is:

1. A fully continuous process for preparing a nonburning granular fertilizer comprising fertilizer grade magnesium ammonium phosphate analyzing about 7–9% nitrogen, as N, and about 42–45% $P_2O_5$, said process comprising;
   (a) reacting ammonia, magnesium hydroxide, and phosphoric acid solution analyzing about 40–58% $P_2O_5$ in the mole ratio of $NH_3:Mg(OH)_2:H_3PO_4$ of about 1–1.1:1:1 to form magnesium ammonium phosphate and granulating the resultant product in a reactor-granulator;
   (b) drying the resulting granules in a drying unit;
   (c) screening the thus dried granules in a screening device and recovering, (1) those granules passing a 3 mesh screen and retained on a 6 mesh screen, and (2) those granules passing a 6 mesh screen and retained on a 16 mesh screen, the recovered granules comprising fertilizer grade magnesium ammonium phosphate analyzing about 7–9% nitrogen, as N, and about 42–45% $P_2O_5$;
   (d) recycling the fine, −16 mesh, granules to the reactor-granulator;
   (e) crushing the overize, +3 mesh, granules and recycling the crushed particles to said screening device;
   (f) simultaneously passing air from the drying and cooling units through dust collectors and recycling the collected dust to the reactor-granulator;
   (g) simultaneously passing exhaust air from the reactor-granulator and the dust collectors through a water scrubbing tower, whereby ammonia vapor in said air is absorbed in water; and
   (h) simultaneously recycling the thus absorbed ammonia to the reactor-granulator.

2. The process of claim 1 in which the phosphoric acid is furnace grade phosphoric acid.

3. The process of claim 1 in which the phosphoric acid is wet process phosphoric acid.

4. The process of claim 1 in which the phosphoric acid solution analyzes about 50–55% $P_2O_5$.

5. The process of claim 1 in which the magnesium hydroxide is fed in the form of an aqueous slurry analyzing about 46% $Mg(OH)_2$.

6. The process of claim 1 in which the magnesium hydroxide is fed in the form of dry $Mg(OH)_2$ while simultaneously feeding water into the reactor-granulator at the rate of about 1.1–1.3 pounds of water per pound of $Mg(OH)_2$.

7. The process of claim 1 in which the ammonia is fed in the form of liquid anhydrous ammonia.

8. The process of claim 1 in which the granules dried in (b) are cooled before they are screened in (c).

9. The process of claim 1 in which the mole ratio of $NH_3:Mg(OH)_2:H_3PO_4$ is about 1.05:1:1.

References Cited by the Examiner
UNITED STATES PATENTS

| | | | |
|---|---|---|---|
| 3,125,411 | 3/1964 | Bridger et al. | 23—105 |
| 3,241,946 | 3/1966 | Young | 71—41 X |
| 3,249,421 | 5/1966 | Bigot et al. | 71—43 X |

DONALL H. SYLVESTER, *Primary Examiner.*

R. BAJEFSKY, *Assistant Examiner.*